(12) United States Patent
Hull et al.

(10) Patent No.: US 7,845,870 B2
(45) Date of Patent: Dec. 7, 2010

(54) MULTI-POSITION MULTI-LEVEL USER INTERFACE SYSTEM

(75) Inventors: Eric J. Hull, Seattle, WA (US); Jeffrey D. Allison, Portland, OR (US); Tyrol R. Graham, Seattle, WA (US); Ryan T. Lane, Seattle, WA (US)

(73) Assignee: Infinum Labs, Inc., Sarasota, FL (US)

( * ) Notice: Subject to any disclaimer, the term of this patent is extended or adjusted under 35 U.S.C. 154(b) by 1313 days.

(21) Appl. No.: 11/121,772

(22) Filed: May 4, 2005

(65) Prior Publication Data

US 2005/0259070 A1 Nov. 24, 2005

Related U.S. Application Data

(60) Provisional application No. 60/569,187, filed on May 7, 2004.

(51) Int. Cl.
*B41J 5/00* (2006.01)
(52) U.S. Cl. ........................ 400/496; 400/472
(58) Field of Classification Search ........... 345/156, 345/168, 169; 400/472, 496
See application file for complete search history.

(56) References Cited

U.S. PATENT DOCUMENTS

| | | | | |
|---|---|---|---|---|
| 5,039,051 A | * | 8/1991 | Umebara et al. | 248/284.1 |
| 5,375,800 A | * | 12/1994 | Wilcox et al. | 248/118.1 |
| 5,765,797 A | * | 6/1998 | Greene et al. | 248/398 |
| 5,949,643 A | * | 9/1999 | Batio | 361/679.27 |
| 6,081,207 A | * | 6/2000 | Batio | 341/20 |
| 6,098,935 A | * | 8/2000 | Kaplan et al. | 248/118.1 |
| 6,290,411 B1 | * | 9/2001 | Shirai | 400/681 |

OTHER PUBLICATIONS

"Pivotally." Merriam-Webster Online Dictionary. 2010. Merriam-Webster Online. Feb. 13, 2010; <http://www.merriam-webster.com/dictionary/pivotally>.*
"Pivot." Merriam-Webster Online Dictionary. 2010. Merriam-Webster Online. Feb. 13, 2010; <http://www.merriam-webster.com/dictionary/pivot>.*
"Acute." Merriam-Webster Online Dictionary. 2010. Merriam-Webster Online. Feb. 13, 2010; <http://www.merriam-webster.com/dictionary/acute>.*
Uludag et al., "Biometric Cryptosystems: Issues and Challenges", Jun. 2004, Proceedings of the IEEE, 92(6): 948-960.*
Itakura et al., "Proposal on personal identifiers generated from the STR information of DNA", International Journal of Information Security, Nov. 2002, 1(3): 149-160.*

* cited by examiner

*Primary Examiner*—My-Chau T Tran
(74) *Attorney, Agent, or Firm*—Polsinelli Shughart PC

(57) ABSTRACT

A multi-positional, multi-level user interface system including a keyboard hinged over a base surface for a pointing device such as a mouse. The keyboard and base rotate relative to each other about a hinge axis to reveal the surface, providing a portable keyboard and pointing surface. A kickstand can support the keyboard above the base while in an open position. The keyboard and pointing device can be used with two hands with the system resting in a user's lap. The keyboard can also swivel about an axis other than the hinge axis. The keyboard can swivel 180 degrees for left-handed use, and can be positioned at other detent angles. A mouse can also be stowed on the base with a magnetic, friction, or other coupling. The interface system can further act as a communication hub for other peripheral devices, such as a joystick, to communicate with a computing device.

14 Claims, 5 Drawing Sheets

MULTI-POSITION MULTI-LEVEL USER INTERFACE SYSTEM

CROSS REFERENCE TO RELATED APPLICATIONS

This application claims the benefit of U.S. Provisional Patent Application 60/569,187 filed May 7, 2004, which is incorporated herein by reference.

BACKGROUND OF THE INVENTION

1. Field of the Invention

The present invention relates to user interface systems, and more particularly, to a user interface system with multiple input and/or output devices that can be positioned at multiple orientations and at multiple distances relative to each other.

2. Description of the Prior Art

Computer keyboards, mice, keypads, and other user interface devices are typically separate from each other and used on a stationary surface such as desk. The mobile computer, commonly referred to as laptop, includes a plurality of interface devices such as, for example, a keyboard, touch pad, trackball, and/or cursor stick. Contrary to the desktop environment, these interface devices are integrated into the laptop housing and are not adjustable to accommodate a users comfort and/or ergonomics.

The laptop interface devices, such as the keys, cursor stick, and/or buttons usually can move relative to the laptop housing, but do not move separately from the laptop housing. Thus, the re-orientation of the laptop affects the orientation of the mouse and other separate interface devices. In the laptop environment the user has no adjustability of the interface devices to accommodate their comfort, preferences and their particular ergonomics.

With the age of wireless interface devices, users of desk based systems are still finding themselves constrained to the desk due to the inability to manage the multiple interface devices when not seated at the desk and use of these interfaces in the living room environment is particularly difficult.

It would therefore be desirable to provide a user interface system that allows adjustability of the multiple input devices with respect to both each other and the surface on which they are supported and not require the user to sit at a desk to manage the same. It would also be desirable to provide a user interface system that allows independent adjustability of multiple input devices to ergonomically accommodate any user.

SUMMARY OF THE INVENTION

It is an aspect of the invention to provide a user interface system that includes multiple input devices and allows for positional adjustment of each input device with respect to each other.

It is another aspect of the invention to provide an integrated keyboard and user interface system in such a way as to allow for couch or floor use.

It is another aspect of the invention to provide an integrated keyboard and user interface system that takes up as little space in width so it can be used virtually anywhere.

These and other aspects are achieved in accordance with an embodiment of the invention wherein the user interface system includes a base, a electronic keyboard pivotally coupled to the base, wherein the keyboard can rotate relative to the base to expose a surface of the base. A groove in opposing sides of the keyboard, along with a rotation guide limit the keyboards rotational movement in one plane about its rotation axis.

The keyboard can include at least one positioning mechanism to hold the keyboard in a rotated position relative to the keyboard support. A kickstand is provided that holds the keyboard in an open position relative to the base. The base provides a support surface for an electronic pointing device, such as, for example a mouse for communicating position information of the pointing device to a computing device.

A stowage coupler integrated into the keyboard support and/or the base functions to hold and secure a pointing device in a stowed location when not in use. A biometric sensor may also be provided on the keyboard for sensing a biological characteristic of a user for possible security applications.

According to another aspect of the invention, the electronic user interface includes a processor, a peripheral communication hub in communication with the processor, a keypad in communication with the processor, a keyboard housing holding the processor, the peripheral communication hub, and the keypad, and a base pivotally coupled to the keyboard housing such that the keyboard housing pivots relative to the base. The peripheral communication hub enables communication between at least one electronic peripheral device and a remote computing device.

A keyboard support is hinged between base and the keyboard and is adapted to support the keyboard housing. The hinged connection between the keyboard support and the base enables the keyboard housing to pivot relative to the base to expose a surface of the base.

Other aspects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views.

DETAILED DESCRIPTION OF PREFERRED EMBODIMENTS

Figure 1:
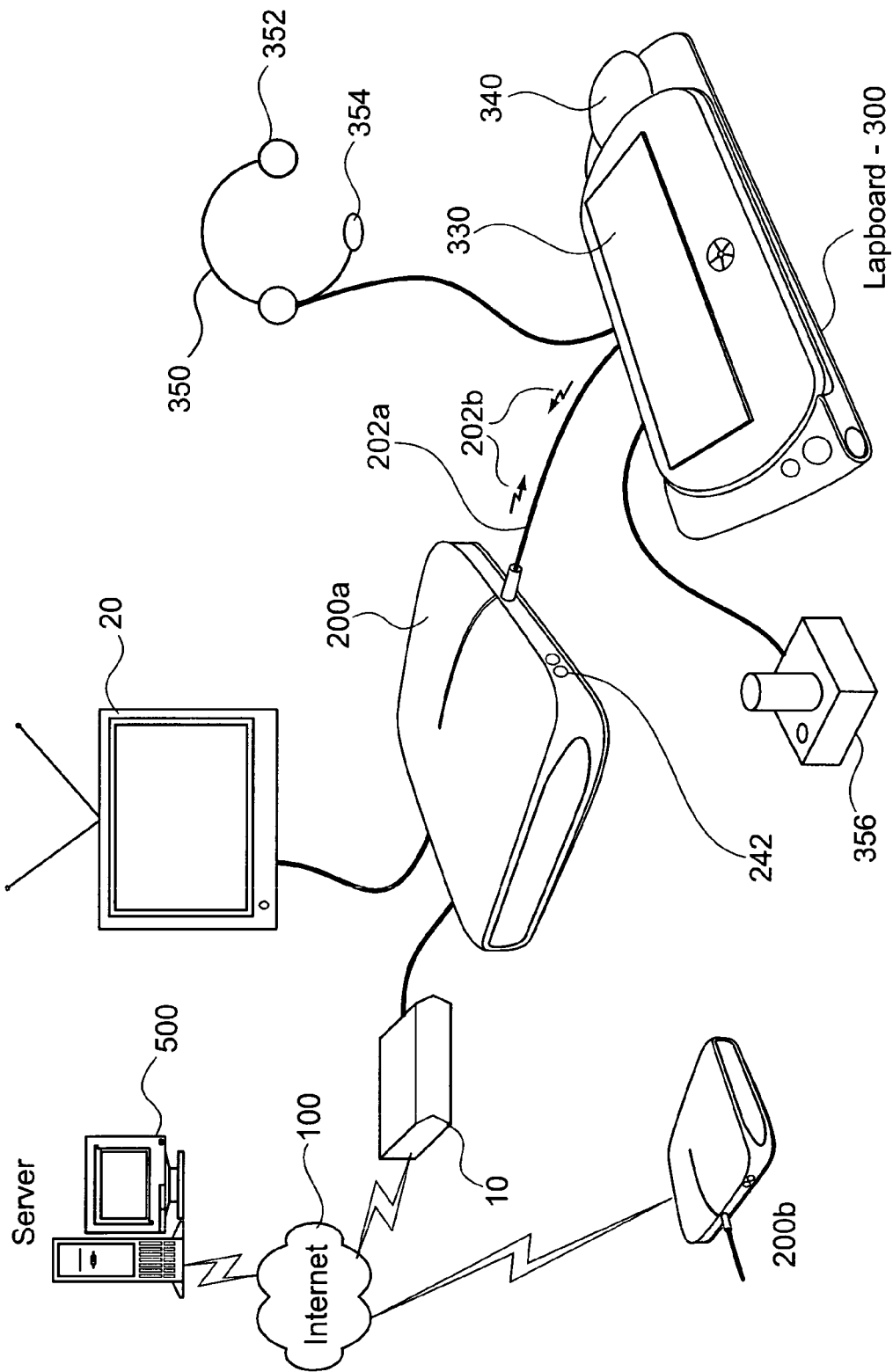
FIG. 1 is a schematic view of an exemplary work environment where the user interface system of the present invention may be used.

FIG. 1 illustrates an exemplary environment in which the present invention may operate. Those of ordinary skill will recognize that not all of the shown components may be required to practice the invention, and variations in the arrangement and type of the components may be made without departing from the spirit or scope of the invention.

A network 100, such as the Internet or any other comparable computer network, enables communication among a number of devices, including a receiver 200, a remote receiver 200b, and a server 500. Receiver 200 generally enables a user to interact with a virtual environment, such as a game, a simulation, and the like. For the virtual environment and other processing, receiver 200 executes both locally stored machine instructions and machine instructions that are communicated from server 500. Receiver 200 can communicate with server 500 through network 100 via a modem 10, such as a cable modem, a digital subscriber line (DSL) modem, and the like. Receiver 200 also communicates with a display 20, such as a high definition television (HDTV), a standard definition television, a computer monitor (e.g., CRT, LCD, Plasma, etc.), or any other suitable known display device.

Receiver 200 communicates through a controller connection 202 to the user interface system or lapboard 300 of the present invention. The lapboard user interface system 300 enables the user to interact with the virtual environment. Controller connection 202 can be a wired connection 202a, or a wireless connection 202b, and is adapted to provide communication according to any one of a number of different local communication protocols, such as, for example, universal serial bus (USB), Bluetooth™, Institute of Electrical and Electronic Engineers (IEEE) 802.11, RF, IR and any other suitably reliable protocol.

Lapboard 300 can be used as a hub for a number of peripheral interfaces (As used herein, Lapboard and user interface system are interchangeable descriptions of the same structure). User interface 300 can rest on a user's lap during use, so the term lapboard is used for convenience, but the term should not be construed as limiting. Lapboard 300 includes a swiveling keyboard 330 and a mouse 340 for user input. Keyboard 330 and/or mouse 340 can be in wired or wireless communication with receiver 200. Other devices can be used for user input and/or output, such as, for example, a joystick 356, a track ball, a wheel, a pedal, a biometric sensor, a tactile feedback device, and the like. Lapboard 300 or receiver 200 can also communicate with a wired or wireless headset 350 for voice and/or other audio input and/or output. Headset 350 includes one or more speakers 352 and a may include a microphone 354 depending on the application.

Figure 2A:
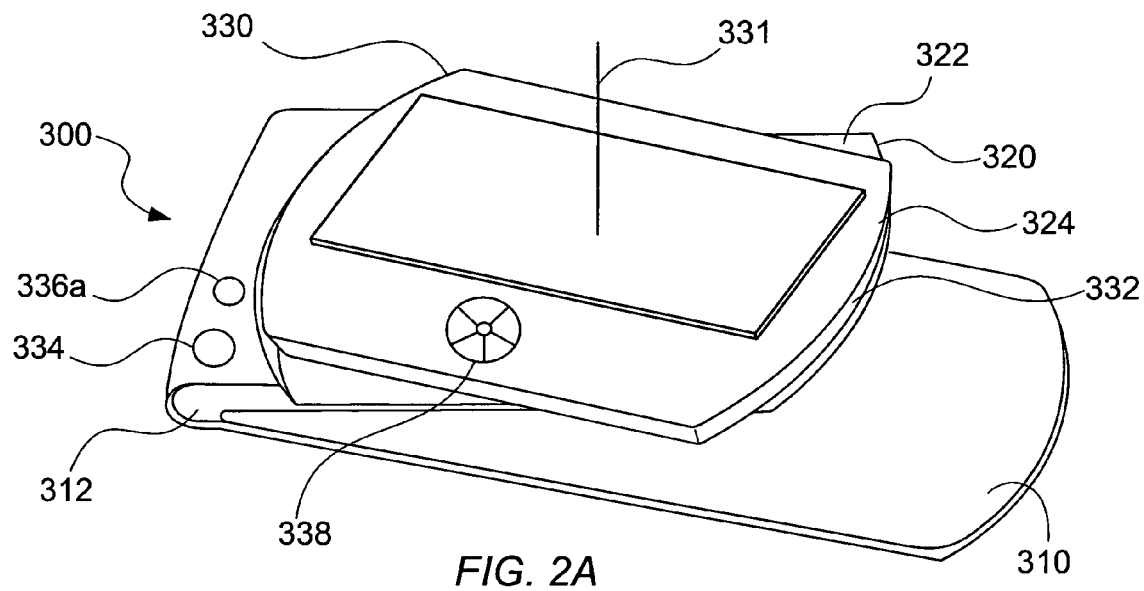
FIG. 2A is a perspective view of a lapboard user interface in an open position according to an aspect of the invention.

FIG. 2A is a perspective view of lapboard 300 in its open position according to an aspect of the invention. Lapboard 300 includes a base 310 that is pivotally coupled by a hinge 312 to a keyboard support 320. Base 310 and keyboard support 320 rotate relative to each other about hinge 312. When keyboard support 320 is rotated away from (i.e., upward from) base 310, a larger surface area 342 of base 310 is available for supporting and moving mouse 340. Keyboard support 320 is also rotationally coupled to swiveling keyboard 330 such that swiveling keyboard 330 rotates about swivel axis 331 and in a plane substantially parallel to an upper surface 322 of keyboard support 320. The swivel axis 331 is also substantially perpendicular to the keyboard support 320, and thereby is also perpendicular with respect to the pivotal axis 313 of hinge 312 (See FIG. 4). Swiveling keyboard 330 can be rotated to any position convenient for a user, including swiveling 180 degrees for a complete reversal of the keyboard orientation and thereby a re-orientation of the hinge 312 location with respect to the user. This 180 degree functionality allows lapboard 300 to accommodate both left and right handed use. The ability to swivel the keyboard is also useful when adjusting lapboard 300 in the user's lap while seated. Swiveling keyboard 330 can be allowed to rotate freely at all times or can be fixed in one or more positions using an incorporated locking system, such as, for example, a detent, a pin, a rotational friction brake, and the like.

At a mouse end or end of surface area 342 of keyboard support 320, a mouse stowage coupler 332a can be attached to, and/or incorporated into, keyboard support 320 and/or swiveling keyboard 322. Mouse stowage coupler 332a assists in holding the mouse 340 in a secured position, such as when lapboard 300 is not in use. Mouse stowage coupler 332a can comprise rubber grips, a magnet, a hook, a loop and/or hook strip (e.g., Velcro™), and the like.

Lapboard 300 can also include a bio metric sensor (or biosensor) 334 for providing an additional layer of security and enabling the detection of a unique user characteristic, such as a finger print, retina scan, DNA, etc. To provide status information, a visual indicator 336a, such as a light emitting diode (LED), a liquid crystal display (LCD), or any other suitable indicator can be included with lapboard 300 and/or the receiver. Other visual effects can also be included, such as backlighting of swiveling keyboard 330, a light over base 310, and the like. Lapboard 300 can also include a navigation control, such as a 5-way navigation control 338. The navigation control can be, for example, a touch pad, a plurality of appropriately arranged buttons and/or joysticks, etc.

Figure 2B:
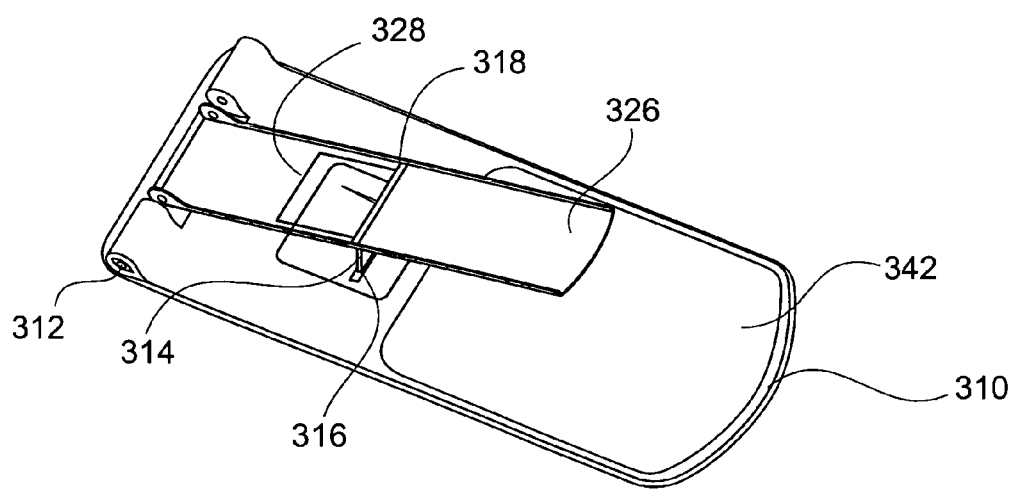
FIG. 2B is a perspective view of the lapboard user interface components used for rotating and supporting the keyboard support relative to base according to an aspect of the invention.

FIG. 2B is a perspective view of lapboard 300 components used for rotating and supporting keyboard support 320 relative to base 310. A keyboard support arm 326 is rotationally coupled to base 310 via hinge 312. When lapboard 300 is fully assembled, keyboard support 320 is rotationally connected to the keyboard support arm 326. In one embodiment, keyboard support arm 326 forms a channel and includes a cutout 328 through which a kickstand 314 can travel as keyboard support arm 326 is rotated relative to base 310. Kickstand 314 rotates about a kickstand hinge 316 that is coupled to base 310. Kickstand 314 can be allowed to rotate to a position that is slightly beyond perpendicular to base 310 to a locking position. As kickstand 314 rotates, a kickstand pin 318 travels in the channel formed by cutout 328 in keyboard support arm 326. When keyboard support 320 is attached to keyboard support arm 326, kickstand pin 318 further operates to assist in the support of keyboard support 320. Those of ordinary skill will recognize that other configurations for kickstand 314 may be implemented without departing from the spirit of the invention. For example, other configurations can include, a pin in a track on a bottom surface of keyboard support 320, a rack and pinion, a spring, a support rod, and the like. In addition to the support components described above, FIG. 2B also illustrates an extent of a surface area 342 which is adapted for use as a mouse surface.

Figure 3A:
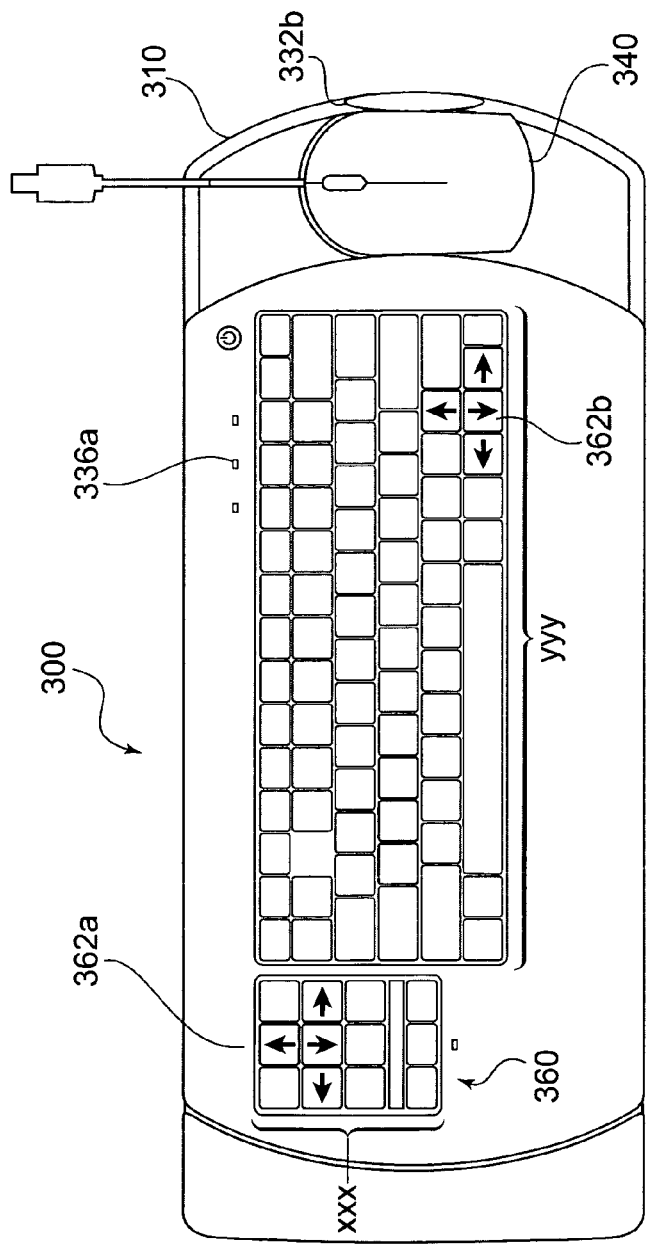
FIG. 3A is a top view of the lapboard user interface with a keyboard and a mouse in a closed position, according to an aspect of the invention.

FIG. 3A is a top view of lapboard 300 in its closed position. Mouse 340 can be held in a stowed position on base 310 by a friction fit between the mouse stowage coupler 332a positioned on the keyboard support 320 and a stowage coupler flange 332b situated on the base 310.

Swiveling keyboard 330 can have a variety of key layouts for conventional or specialized use. For example, one embodiment includes a numeric keypad 360 located on a left side of swiveling keyboard 330. Some keys can also be configured for specific uses, such as navigating a cursor. For instance, arrow key sets 362a and 362b can be arranged in an inverted-T for easy navigation with four fingers. Multiple sets of arrow keys enable both left-handed persons and right-handed persons to use swiveling keyboard 330 and mouse 340 concurrently. For left-handed persons, lapboard 300 can be rotated 180 degrees so that mouse 340 (as disposed on base 310) is on the left side. The swiveling keyboard 330 can then be rotated 180 degrees to be facing the user in the appropriate positions.

Figure 3B:
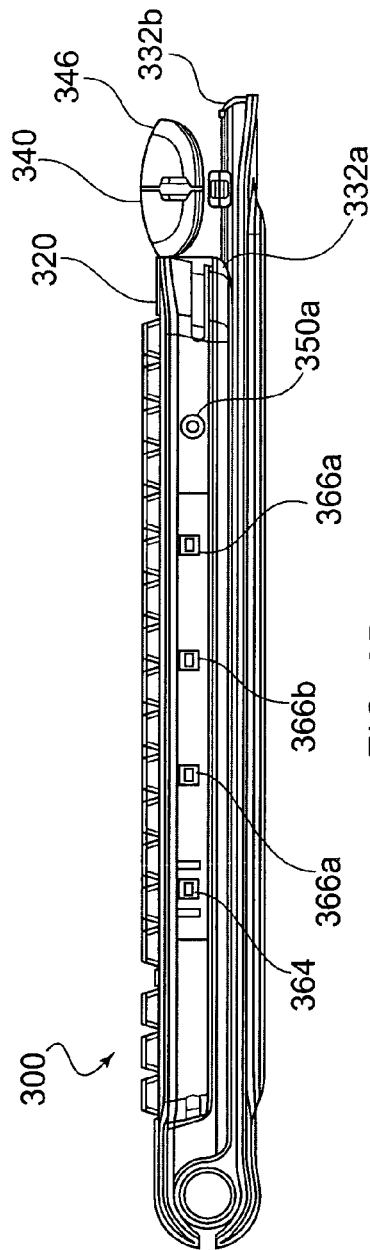
FIG. 3B is a front view of the lapboard user interface in its closed position according to an aspect of the invention.

FIG. 3B is a front view of lapboard 300 in its closed position. Mouse 340 is shown held in its stowed position by a friction fit between stowage coupler flange 332b disposed on base 310 and the outer edge 332a of keyboard support 320. To assist with the friction fit, and ease of holding, mouse 340 can be formed with a concave perimeter 346. Lapboard 300 includes a receiver jack 364 for connecting the lapboard to a computing device such as receiver 200, a personal computer (PC) or any other computing device. Lapboard 300 can also act as a USB hub with one or more auxiliary USB jacks 366a through 366c. One or more of the auxiliary jacks can be used for communicating signals between mouse 340 and the computing device. In addition, or alternatively, an audio jack 350a is included for communication with an audio device such as a headset or connected speakers.

Figure 4:
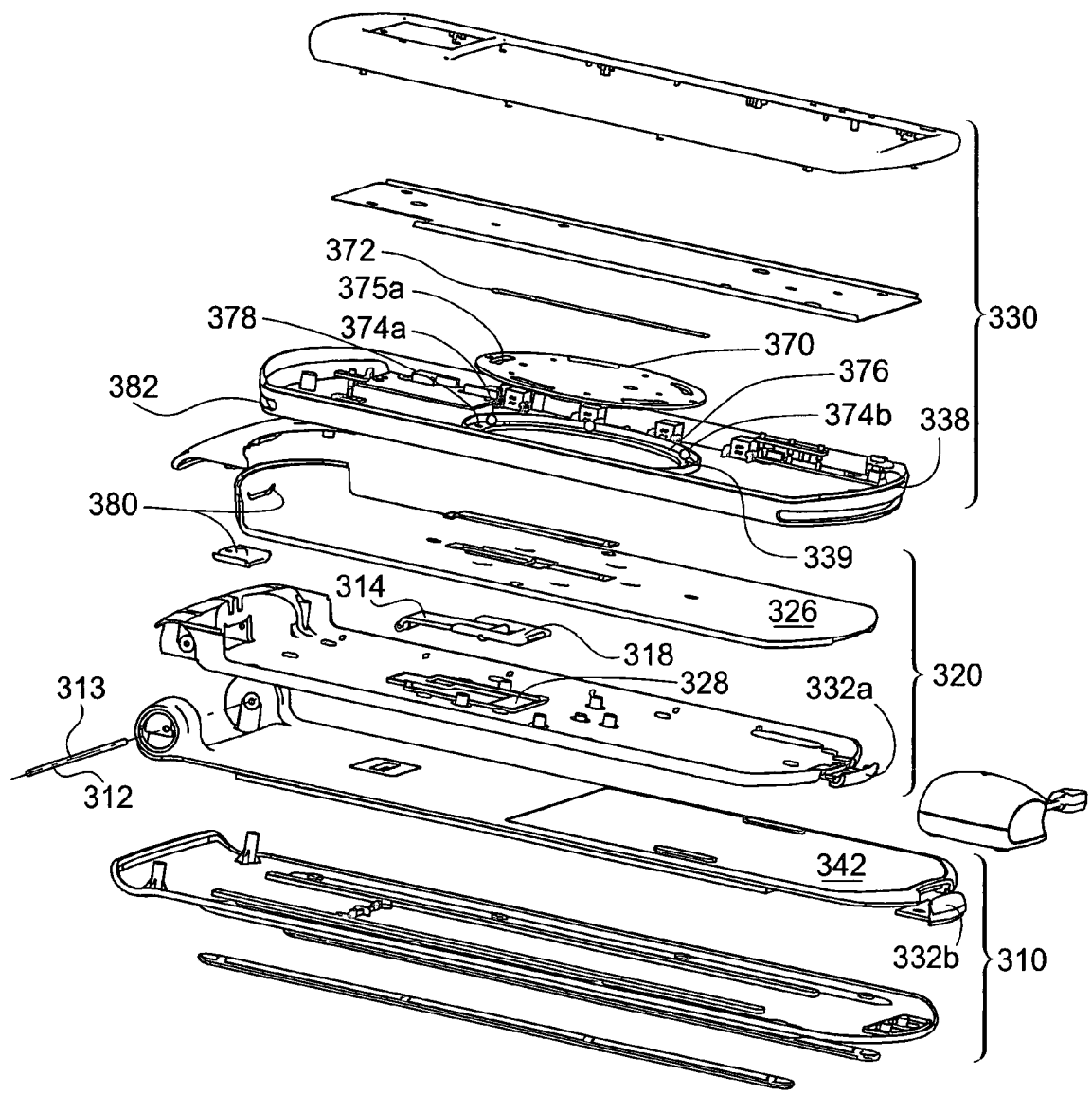
FIG. 4 is an exploded perspective view of the components that enable the swiveling keyboard of the lapboard user interface to rotate according to an aspect of the invention.

FIG. 4 is an exploded view of lapboard 300 consisting of the base portion 310 and the keyboard support 320 and the swiveling keyboard portion 330. As explained above, the base portion 310 is connected to the keyboard support 320 at an acute angle. In one embodiment, the hinge 312 provides a degree of rotation between the base 310 and the keyboard support about the axis of the hinge. In other embodiments, base 310 and keyboard support 320 can be in fixed connection with respect to each other such that an acute angle between the two is constantly maintained. In this fixed embodiment, the distance between base 310 and the angularly connected keyboard support 320 at the side opposite the connection, is such that a user may use a mouse or other pointing device under the angularly mounted keyboard (i.e., keyboard support with keyboard mounted thereon) with respect to the base.

According to another embodiment with a fixed angular connection between the base 310 and the keyboard support 320, the base 310 is longer than the keyboard 330 such that the extended surface area 342 extends out from under the angularly mounted keyboard so as to provide an accessible pointing device surface (342).

A keyboard lower housing 338 rotates between a bearing plate 370 and keyboard support arm 326 of the keyboard support 320. Bearing plate 370 can be formed from an ultra high molecular weight material or other strong and light material that provides low friction. Bearing plate 370 is slightly force fit into a rotation tray 339 of keyboard lower housing 338. The slight force fit keeps the swiveling keyboard from rotating too freely, yet enables a user to rotate the swiveling keyboard with a small amount of finger force. Bearing plate 370 is also attached to keyboard support arm 320 such that bearing plate 370 remains stationary relative to keyboard support 320. Keyboard lower plate (housing) 338 is not fixed to support arm 326. Keyboard lower plate 338 is rather "held captive" to keyboard support arm 326 by bearing plate 370. Bearing plate 370 is firmly affixed to keyboard support arm 320 while allowing keyboard lower plate 338 to rotate on the low friction bearing surface 376, via bearings 374a and 374b. The bearings can be formed from a low friction plastic, metal, or other material. The bearings are allowed to rotate within bearing holes 375a and 375b, which are formed in bearing plate 370. The bearings are held in place by a spring 372, which is attached to bearing plate 370. The bearings roll along a bearing surface 376 within rotation tray 339. Bearing surface 376 includes hollows 378 into which the bearings are forced by spring 372 when keyboard lower housing 338 is rotated. These hollows provide detent positions for holding the swiveling keyboard at a fixed angle. A user can overcome the detent positions with finger force. Other rotation and/or detent mechanisms can be used for the swiveling keyboard.

The keyboard lower housing 338 includes grooves 382 disposed on the opposing sides thereof. Grooves 382 are adapted to receive a rotation guide 380. The rotation guide 380 prevents keyboard 330 from being over rotated in any one direction, and can be operated to lock the keyboard 330 in a desired position, and/or may be released so as to rotate keyboard 330 180 degrees for right or left handed use. Any suitable mechanical or spring assisted mechanical device may operate as rotation guide 380.

Figure 5:
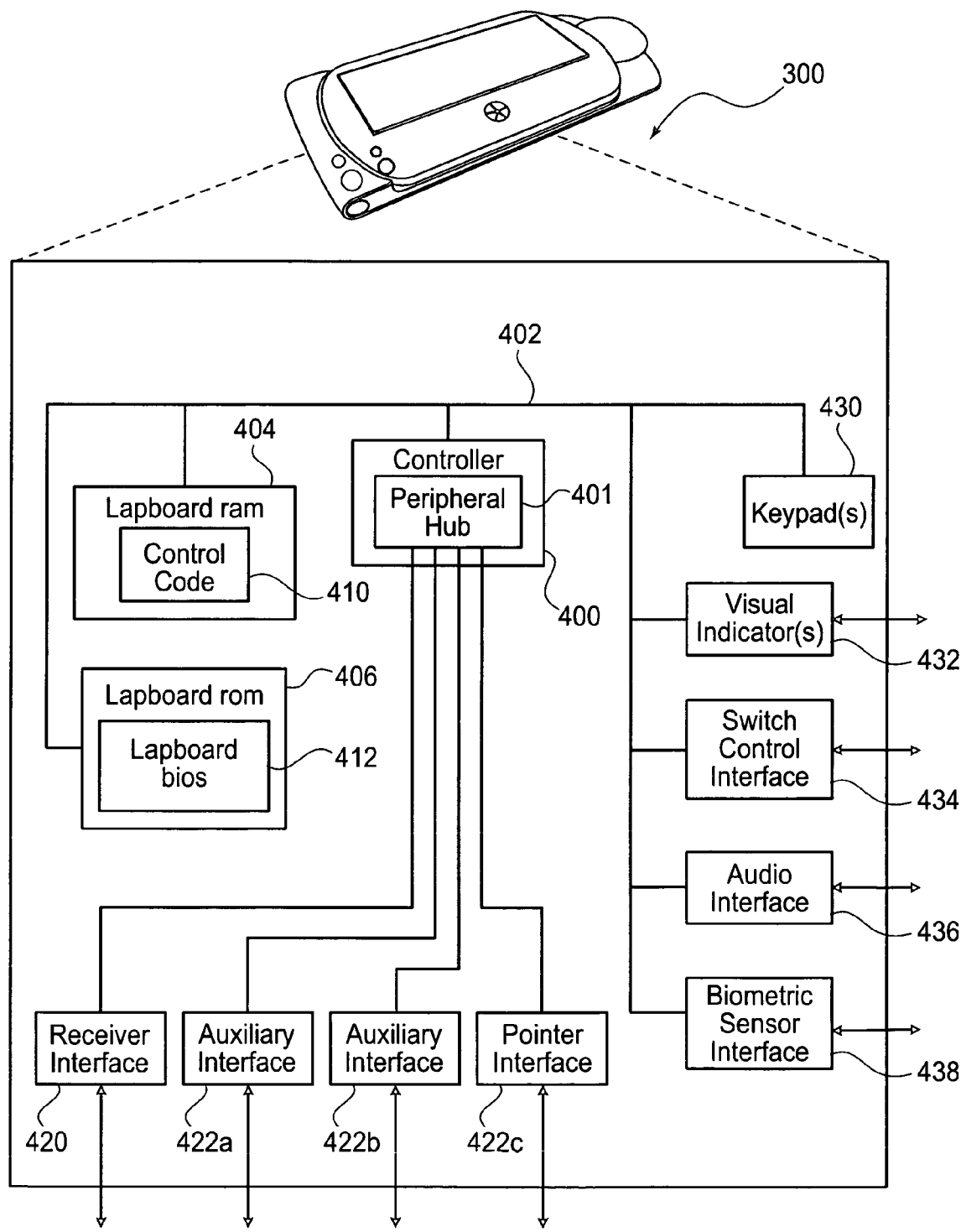
FIG. 5 is a functional block diagram of electronic components of the lapboard user interface according to an aspect of the invention.

FIG. 5 shows a functional block diagram of an exemplary lapboard 300, according to an embodiment of the invention. Lapboard 300 may include many more components than those shown. The components shown, however, are sufficient to disclose an illustrative embodiment for practicing the invention.

Lapboard 300 includes a controller 400 and a mass memory in communication with each other via a bus 402. In one embodiment, controller 400 includes a peripheral hub 401, such as a USB hub, to control all peripheral communication with receiver 200. An example of such a controller includes a CY7C66113-PVC from Cypress Semiconductor Corp. The mass memory generally includes a lapboard RAM 404, a lapboard ROM 406, and can include one or more permanent mass storage devices, such as a ROM, or one time write memory device, and the like. The mass memory stores control code 410 for controlling the operation of lapboard 300. A lapboard BIOS 412 is also provided for controlling low-level operation of lapboard 300.

Controller 400 communicates with the receiver or other computing device via a receiver interface unit 420, which is constructed for use with serial or parallel communication protocols, including USB and the like. Receiver interface unit 420 can be configured for wired or wireless communication via infrared signals, radio frequency signals, or any other suitable wireless protocol. Auxiliary interface units 422a and 422b can also communicate with controller 400 to enable additional peripheral devices, such as, for example, a joystick, steering wheel, foot pedals, etc. to communicate with the receiver or other computing device. A similar interface unit is provided as a pointer interface unit 422c for communicating with a pointing device such as a mouse, trackball, electronic pen, etc. Interface units 422a-422c can use serial or parallel communication protocols, and be configured for wired or wireless communication.

Lapboard 300 also includes keypad(s) 430 (e.g., xxx and yyy of FIG. 3a) in communication with controller 400. Keypad 430 may include circuitry for interpreting activations of keys. One or more visual indicators 432, such as light emitting diodes, are in communication with controller 400 and provide status indications such as power setting, disk drive access activity, network communication activity, and the like (See for example, visual indicators 336a, 360 and 336b). A switch control interface 434 interprets activation of a 5-way control switch 338, an embedded thumbstick, and/or any other switches or controls. Lapboard 300 further includes an audio interface 436 for communicating with audio devices such as a headset, speakers, hi-fi equipment, and the like. A biometric sensor interface 438 processes signals of the biometric sensor 334.

While there have been shown, described and pointed out fundamental novel features of the invention as applied to preferred embodiments thereof, it will be understood that various omissions, substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed, described or suggested form or embodiment as a general matter of design choice. It is the intention, therefore, to be limited only as indicated by the scope of the claims appended hereto.

What is claimed is:

1. A user interface system comprising: a base and an electronic keyboard pivotally coupled to the base, wherein the keyboard can rotate relative to the base to expose a surface of the base, wherein the keyboard is rotationally coupled to the keyboard support such that the keyboard can rotate relative to the keyboard support, wherein the keyboard rotates about a perpendicular axis that is substantially perpendicular to the keyboard support.

2. The user interface system of claim 1, further comprising: a groove in opposing sides of the keyboard; and a rotation guide attached to the keyboard support and interfacing with the groove in the keyboard.

3. The user interface system of claim 1, wherein the keyboard includes at least one positioning mechanism to hold the keyboard in a rotated position relative to the keyboard support.

4. The user interface system of claim 1, further comprising a kickstand that holds the keyboard in an open position relative to the base.

5. The user interface system of claim 1, wherein the base is sized to rest on a user's lap.

6. The user interface system of claim 1, wherein the surface of the base supports an electronic pointing device for communicating position information of the pointing device to a computing device.

7. The user interface system of claim 6, wherein the surface of the base comprises a mouse pad.

8. The user interface system of claim 6, further comprising a pointing device storage coupler that holds a pointing device in a stowed location when the pointing device is not in use.

9. The user interface system of claim 6, further comprising a pointing device communication module that enables the pointing device to communicate through the user interface system to an electronic computing device.

10. The user interface system of claim 1, further comprising a communication module that enables the electronic keyboard to communicate with a computing device through one of a wired and a wireless connection.

11. The user interface system of claim 1, further comprising a visual indicator that indicates a status of communication with a computing device.

12. The user interface system of claim 1, further comprising a multi-positional switch pad.

13. The user interface system of claim 1, further comprising a biometric sensor that senses a biological characteristic of a user, wherein the biological characteristic includes a fingerprint, a DNA sample, or retina scan.

14. The user interface system of claim 1, further comprising an audio communication module that enables audio signals to be communicated between the user interface system and an audio transducing device.

* * * * *